United States Patent [19]

Ota et al.

[11] Patent Number: 4,715,983

[45] Date of Patent: Dec. 29, 1987

[54] METHOD OF STORING A SOLID CHLORINATING AGENT

[75] Inventors: Masanori Ota, Chiba; Hitoshi Sasahara, Tokyo, both of Japan

[73] Assignee: Nissan Chemical Industries, Ltd., Japan

[21] Appl. No.: 809,005

[22] Filed: Dec. 16, 1985

[30] Foreign Application Priority Data

Dec. 18, 1984 [JP] Japan ................................ 59-266737

[51] Int. Cl.$^4$ .......................... C11D 7/54; C11D 3/48; B65D 81/24; B01D 53/04

[52] U.S. Cl. .......................... 252/186.35; 252/186.34; 252/186.36; 252/187.1; 423/503; 206/524.4; 502/413; 502/415; 502/417

[58] Field of Search ...................... 252/186.34, 186.35, 252/186.36, 187.1, 187.34; 55/71, 75; 502/405, 407, 413, 415, 417; 423/240 S, 240 R, 241, 503; 206/524.4

[56] References Cited

U.S. PATENT DOCUMENTS

| | | | |
|---|---|---|---|
| 3,061,549 | 10/1962 | Dickey | 252/186.35 X |
| 3,936,394 | 2/1976 | Kusunose et al. | 502/106 |
| 4,256,728 | 3/1981 | Nishino et al. | 423/230 X |
| 4,334,610 | 6/1982 | Ota et al. | 206/205 |
| 4,380,501 | 4/1983 | Wojtowicz et al. | 252/186.35 X |
| 4,389,325 | 6/1983 | Erg et al. | 252/186.35 |
| 4,414,111 | 11/1983 | Iwaisako et al. | 210/500.2 |
| 4,421,533 | 12/1983 | Nishino et al. | 55/68 |
| 4,444,316 | 4/1984 | Casberg | 252/186.35 X |
| 4,534,775 | 8/1985 | Frazier | 55/74 |

FOREIGN PATENT DOCUMENTS

| | | | |
|---|---|---|---|
| 58-101199 | 6/1983 | Japan | 252/186.35 |

*Primary Examiner*—John F. Terapane
*Assistant Examiner*—Virginia B. Caress
*Attorney, Agent, or Firm*—Parkhurst & Oliff

[57] ABSTRACT

Solid chlorinating agents can be stored highly stably and safely in a closed system for a long period of time without discoloring or deterioration, when a storage stabilizer of alumino-silica gel obtained from allophane incorporated with active carbon is placed in the ambient atmosphere enclosing the chlorinating agents, preferably not in direct contact with the agents. In addition, the agents do not cause damages on the surface and material of, or breakdown of, the container constituting the closed system, and no offensive odor is generated upon opening even after a prolonged storage.

8 Claims, No Drawings

METHOD OF STORING A SOLID CHLORINATING AGENT

BACKGROUND OF THE INVENTION

1. Field of the Invention

The present invention relates to a method of storing a solid chlorinating agent which tends to generate gases, such as chlorine gas and nitrogen chloride gas, upon decomposition during storage.

2. Brief Description of the Invention

Solid chlorinating agents have been widely employed for practical use in various fields as disinfectants, germicides, bleaching agents and the like. Such solid chlorinating agents include chlorinated isocyanuric acid such as trichloroisocyanuric acid, dichloroisocyanuric acid, anhydride, monohydrate or dihydrate of sodium or potassium dichloroisocyanurate and a mixture thereof, and high grade bleaching powder, as well as a composition thereof incorporated with auxiliary agents. The chlorinating agents have been used in various forms, such as powders, granules, grains, pellets and tablets.

The solid chlorinating agents are usually stored and transported in closed packing containers which are made of such materials as paper, plastics and metals. Since the solid chlorinating agents are often stored for a prolonged period of time, e.g., up to 1 to 2 years, after manufacture before they are actually used on site, noxious gases could be generated upon decomposition of the solid chlorinating agents and the generated gases may exert undesirable influences, causing in extreme cases dangerous incidents. For example, such noxious gases may cause label information inked on a container to become unclear or faded away completely. The gas generation also may cause the corrosion of packing materials or the breakdown of containers per se due to an increase in internal pressure therein. In addition, the gases generated by decomposition may give unpleasant feeling to workers upon opening of a packing container or during use on the site and could even be harmful to the human body. It is therefore strongly desired to solve the above problems.

Many attempts have been made so far to overcome the said problems involved in the generation of the noxious gases. One attempt is to decrease the water content in the product, thereby preventing the generation of the gases during storage. However, it is almost practically impossible to commercially produce products virtually free from water. It also have been attempted to store the product under a circumstance where the moisture contained in the outside atmosphere is completely blocked. However, even in cases where a container composed of a metallic material capable of completely blocking the outside moisture are used, the metallic material may be subject to corrosion and the container per se may be deformed or even broken during long periods of storage due to increase in the internal pressure of the container caused by the gradual accumulation of the decomposed gases. A further attempt also has been made to prepare the product in granular or tablet form, so as to reduce the specific surface area of the products and, as a consequence, to reduce the generation of the gases. The method, however, gives only unsatisfactory results for a storage over an extended period of time.

In U.S. Pat. No. 4,334,610 is proposed a method in which a porous gas-permeable bag charged with a compound, such as calcium oxide, sodium phosphate, ferrous oxide and magnesium oxide, is placed in a container employed for the storage of solid chlorinating agents. By this method, however, there is a room for more suppressing, the generation of chlorine, nitrogen chloride and oxidized chlorine gases and the available chlorine contained in the chlorinating agents tends to be rather decomposed in undesirably large amounts.

U.S. Pat. No. 4,389,325 proposes a method for suppressing the generation of chlorine gas by the use of a certain synthetic zeolite, which is mainly consisted of alumino silicate. However, according to tests carried out by the inventors, no marked effects could be obtained by this method (see Comparative Examples 1, 5 and 9 described hereinafter).

SUMMARY OF THE INVENTION

Accordingly, it is an object of the present invention to provide a method of conveniently storing a solid chlorinating agent including trichlorinated isocyanuric acid, dichlorinated isocyanuric acid, sodium or potassium dichlorinated isocyanurate, high grade bleaching powder containing calcium hypochlorite or sodium chlorite or a mixture thereof in a closed container for a long period of time, to prevent the generation of noxious gases, by adsorbing effectively the gases generated by natural decomposition, and prevent the damage or breakdown of the container surface or materials or the diffusion of the noxious gases or offensive odors upon opening of the container.

Another object of the present invention is to provide a method of storing for a prolonged period of time the solid chlorinating agent in a closed container without decrease in efficiencies and transformation or coloring of the agent and further without existence of undesirable foreign materials when used on site.

A further object of the present invention is to provide a packing container containing the solid chlorinating agent for a long period of time, without the accelerated generation of the noxious gases or offensive odors upon the opening of the container and with improved storage characteristics.

DETAILED DESCRIPTION OF THE INVENTION

It might be conceivable to use a desiccant to solve the above problems since the solid chlorinating agent are highly sensitive to moisture. However, not a few desiccants attract moisture from the atmosphere and exert adverse effects to the solid chlorinating agent. On the other hand, known adsorbents, such as active carbon and activated clay, have only insufficient capacity for adsorbing chlorine gas and chlorine-containing gases and tend to be saturated within a short period of time. Known adsorbents are, therefore, of little practical value.

In U.S. Pat. No. 4,334,610, the inventors have proposed a method for stably storing the solid chlorinating agent for a long period of time, whereby a storage stabilizer, such as sodium tertiary phosphate, calcium oxide and magnesium oxide is placed in the atmosphere enclosing the solid chlorinating agent in such a manner that the stabilizer is in contact with the gases in the atmosphere enclosing the chlorinating agent but not in direct contact with the said agent.

The inventors have conducted intensive studies to further improve the above method and, as a result, have found that alumino-silica gel prepared from hydrated amorphous aluminium silicate (allophane)—via such steps as purification, dehydration and drying—and represented by the following general formula:

$Al_2O_3.mSiO_2.nH_2O+Al(OH)_3$ wherein m is 1 to 2 and n is 2 to 3, shows only insufficient effects for the solid chlorinating agent, as in the case of synthetic zeolite (see Comparative Examples 3, 8 and 10), but active-carbon containing alumino-silica gel granules prepared from the above-described alumino-silica gel—via such steps as mixing, kneading, granulation and drying—show surprisingly strong stabilizing effects for the solid chlorinating agent.

Accordingly, the present invention relates to a method of storing a solid chlorinating agent, wherein granules prepared from active carbon and alumino-silica gel, via such steps as kneading, granulation and drying, is placed as a stabilizer for the solid chlorinating agent or a composition comprising said agent, in the ambient atmosphere enclosing said agent or composition.

In the method of the present invention, the stabilizer obtainable from active carbon and alumino-silica gel through the above steps would cause no adverse effects even when placed in direct contact with the said chlorinating agent or a composition thereof in the ambient atmosphere which surrounds the stabilizer. However, it is preferable to use the stabilizer in such a state that it is in contact with the ambient atmosphere but not in direct contact with said chlorinating agent or a composition thereof in order to avoid the stabilizer in the solid chlorinating agent being considered as a foreign matter. The method of the present invention may be practiced in various manners. For example, the stabilizer may be placed at the lid or cap of a container. It may be filled in a bag of a porous film composed, e.g., of polypropylenes, polyethylenes or polyesters and the bag filled with the stabilizer may be placed in a container together with the solid chlorinating agent or a composition thereof.

As alumino-silica gel for preparing the stabilizer, there may be preferably used those represented by the following general formula:

$Al_2O_3.mSiO_2.nH_2O+Al(OH)_3$ in which m is 1 to 2 and n is 2 to 3, and prepared from allophane (amorphous hydrated silicate of aluminium) via such steps agitating or stirring and as slurrying of the raw material in water, purification of the slurry to separate foreign substances contained therein, dehydration, drying and grinding.

As the stabilizing agent for the present invention, there may be preferably used those prepared from active carbon and the alumino-silica gel described above in accordance with the following process: To 100 parts by weight of the alumino-silica gel is added 5 to 300 parts by weight, preferably 10 to 100 parts by weight, of active carbon, and the resulting mixture is kneaded, granulated and dried. The granulation may be preferably effected by use of an extrusion granulator, and the granulated product may be preferably dried at a temperature of 150° C. to 250° C. Powdery active carbon may be used with advantage for the above preparation.

As examples of solid chlorinating agents to be stabilized by the method of the present invention, mention may be made of trichloroisocyanuric acid, dichloroisocyanuric acid, anhydride, monohydrate or dihydrate of sodium or potassium dichloroisocyanurates and a mixture thereof, and high grade bleaching powder. The method of the present invention may also be applied to a composition of the above-described chlorinating agents which may be incorporated with an auxiliary agent. The stabilizer may be in the form of powders, granules, pellets or tablets.

The storage stabilizer may be used in an amount of from about 0.1 to about 10 percent by weight, preferably from aboout 0.2 to about 5 percent by weight, with respect to the weight of the solid chlorinating agent to be stored in a closed container. The amount of the storage stabilizer to be placed with the solid chlorinating agent in a closed container may be varied depending upon the material of a container in which the agent is stored, the temperature of storage, duration of storage and the like. For example, an amount as much as 1 percent by weight based on the solid chlorinating agent is enough where the agent is stored in a closed metal container. In this case, no odors associated with the decomposition of the solid chlorinating agent was perceived even after storage for 30 days at room temperature.

The storage stabilizer to be used in the present invention may be arranged under closed circumstance in such a manner that the stabilizer is placed in contact with the ambient gas. The terms "closed circumstance" referred to throughout the specification and claims are intended to mean a closure around the chlorinating agent intercepting the outside atmosphere from the chlorinating agent. Such a closed circumstance usually contains air, gases generated from the solid chlorinating agent upon decomposition and the atmospheric air permeated from the outside atmosphere when stored in a container composed of materials capable of permeating air to an extremely slight extent. The closed container to be used for the storage in the present invention may be of any shape which may be appropriate for packing, storage, and transportation and may be in the form of paper bags or boxes, plastic film bags, or molded containers, metal cans, fiber drums, and the like. Containers such as apparatus, vessels, mixers or the like, for example for the manufacturing of the solid chlorinating agent, having a vent, may also be employed for temporary storage when the storage is conducted without forced ventilation and where a closed circumstance may be formed within the inside of said container where the solid chlorinating agent is stored.

In accordance with the present invention, the solid chlorinating agent is placed together with the storage stabilizer in a closed container in such a manner that the gases generated by the decomposition of the solid chlorinating agent are brought into contact the storage stabilizer per se, but that the storage stabilizer does not contact with the solid chlorinating agent. The mode of arrangement for placing the agent to be stored and the stabilizer in a closed container is not limited to a particular one.

When the stabilizer is employed in the form of, for example, powders, granules, grains and tablets, the stabilizer should be placed in such a manner that the stabilizer may be packed in a container, for example, a bag, composed of a material such as paper or plastic sheeting having pores small enough to permit the gases to be adsorbed to pass therethrough. The mode of placing the stabilizer is, for example, merely placing the package of the stabilizer anywhere around the agent to be stored within spaces defined in the container.

The storage stabilizers may be used alone or in combination with each other and usually in granular, powdery grainy or tabletted form or as a composition where one or more of the storage stabilizers may be finely dispersed in a plastic material including, for example, polyolefinic resins such as polyethylene, copolymers of ethylene and propylene butene, vinyl acetate, or the like, polypropylene or a mixture thereof, polyvinyl chloride resins such as polyvinyl chloride, copolymers of vinyl chloride and ethylene, propylene, vinyl acetate or other copolymeric monomer and polymers of vinylidene chloride and copolymers thereof with other copolymerizable monomers. The composition to be used in the present invention may be preferably prepared by mixing the storage stabilizer and the plastic material under the molten state of the plastic material and then permitting the mixture to solidify by cooling it to room temperature. The composition may usually be molded to a desired shape such as granules or pellets, filaments, sheets, films or plates.

The storage stabilizer composition as prepared hereinabove from the stabilizer and the polymer resins may be preferably employed in place of the stabilizer package as hereinabove. This is one of the preferred embodiments of the present invention, whereby the purposes of the present invention can be conveniently achieved. The composition to be used in the present invention may contain from about 10 to about 60 percent by weight of the stabilizer. The composition may also contain additives such as auxiliary substances for processing, fillers and other stabilizers as long as they do not adversely affect the effect of the stabilizer in the composition. The composition may be preferably employed in a form of granules, pellets, powders, filaments, films, sheets or plates which may be prepared in such a manner as having pores small enough to permit the penetration of the gases to be adsorbed, but disallow the leakage of the stored agent. They may be easily prepared in conventional manner, for example, by mixing with mixing rolls or screw extruders and moled into desired shapes such as granules, pellets, filaments, films, sheets, plates, bags and other containers. The composition of the stabilizer in the granule, pellet, filament, film, sheet or plate forms may be used, as a preferred embodiment of the present invention, merely by placing it anywhere around the agent in a space defined among the solid chlorinating agents in the container. The bags or containers made of the composition may also be used, as another preferred embodiment of the invention, into which the solid chlorinating agent may be placed for storage. These bags or containers, which are sealed in conventional manner, may be used alone for storage without an outer case to contain them for a relatively short period of time and may be transported as they are. The bags or containers made of the composition contained with the agent also may be more preferably placed in another outer container or case more rigid than the former for enduring a longer term of storage.

When the stabilizer itself is used directly in the form of powders, granules or tablets etc. and in direct contact with the solid chlorinating agent as in the case of being mixed with the agent, the decomposition of the agent, is not accelerated.

When the storage stabilizer is placed in a closed container in accordance with the method of the present invention, it has now been found that the decomposition of the solid chlorinating agent is not accelerated and the storage stabilizer can strongly adsorb and fix thereon the noxious gases generated from the agent during storage. Accordingly, the storage stabilizer of the present invention hardly causes transformation or coloring of the solid chlorinating agent to be stored. The effect of the employment of such storage stabilizer is remarkable and can not be achieved by the use of conventional agents such as active carbon. Further, in accordance with the present invention, the solid chlorinating agent may be stored for a long period of time with safety and stability. And the present invention does not generate gases and produce hazardous and undesirable odors upon opening of the container where the agent is stored.

The following examples illustrate the present invention more in detail, but should not be construed as limiting the invention thereto. In Tables 1 and 2 are shown solid chlorinating agents and storage stabilizers used in the following Reference examples, Comparative examples and Examples.

TABLE 1

Solid Chlorinating Agent Used

| No. | Agent Used | Appearance | Shape | Content of Available Chlorine (%) |
|---|---|---|---|---|
| 1 | High grade bleaching powder | White granules | 300 to 3000μ | 70.7 |
| 2 | " | White tablets | 30 mmø 15 g/tablet | 70.1 |
| 3 | Trichloroisocyanuric acid | White powders | 80 to 500μ | 91.4 |
| 4 | " | White granules | 300 to 2000μ | 90.7 |
| 5 | " | White tablets | 30 mmø 15 g/tablet | 90.7 |
| 6 | Sodium dichloroisocyanurate | White granules | 300 to 2000μ | 61.7 |
| 7 | Sodium dichloroisocyanurate dihydrate | White granules | 500 to 2000μ | 52.9 |
| 8 | Potassium dichloroisocyanurate | White granules | 500 to 1500μ | 58.6 |

TABLE 2

Stabilizers Used

| No. | Stabilizer | Appearance | Shape | Remarks |
|---|---|---|---|---|
| 1 | Synthetic zeolite | White spheres | 1 to 3.0 mmø | Molecular Sieve 13X |
| 2 | Active carbon | Black granules | 2 to 5 mm | Reagent |
| 3 | " | Black powders | 50 to 200μ | " |
| 4 | Alumino-silica gel | Granules | 0.5 to 3 mm | Prepared from allophane |
| 5 | Alumino-silica gel kneaded together | Black granules | 0.5 to 3 mm | Prepared in Example 1 |

TABLE 2-continued

| No. | Stabilizer | Stabilizers Used Appearance | Shape | Remarks |
|---|---|---|---|---|
| | with active carbon | | | |

REFERENCE EXAMPLE 1

[High grade bleaching powder (granule) was used as a solid chlorinating agent]

Into a bag measuring 150 mm in length by 120 mm in width and made of a medium or low pressure polyethylene film having a thickness of 120μ was charged 100 g of granules of high grade bleaching powder. The bag was heat sealed and stored in a thermo-hygrostat for 30 days at 40° C. at a relative humidity of 80%. The bag was then taken out of the thermo-hygrostat and the density of chlorine gas in the polyethylene bag was measured by a detector. The density of generated chlorine gas was 600 ppm.

Thereafter, the bag was opened and the appearance, especially the state of consolidation and wetting, of the solid colorinating agent was observed. The surfaces of the agent were consolidated and wet. Part of the consolidated chlorinating agent (about 15 g) was ground uniformly in a mortar, and the content of available chlorine contained in the sample was measured by means of iodometry. The sample had a content of available chlorine of 39.3%, which was 44.4% less than the initial content of available chlorine. In other words, the decomposition rate of the agent was 44.4%.

COMPARATAIVE EXAMPLE 1

Into a bag measuring 30 mm in length by 20 mm in width and made of a fine porous gas-permeable film (trade name "Cellboa NW-04" by Sekisui Chemical Co., Ltd.) having a thickness of 140μ was charged 2 g of synthetic zeolite as a stabilizer. The bag was placed in a bag with 150 mm in length and 120 mm in width and made of a medium or low pressure polyethylene film having a thickness of 120μ as used in Reference Example 1 together with 100 g of high grade bleaching powders. The polyethylene bag was heat sealed and stored in a thermo-hygrostat for 30 days at 40° C. at a relative humidity of 80%. The content of available chlorine contained in the sample was measured in the same manner as in Reference Example 1. A decomposition rate of 26.3% was obtained.

Example 1

Alumino-silica gel having the general formula: $Al_2O_3.mSiO_2.nH_2O+Al(OH)_3$ (in which m is 1 to 2 and n is 2 to 3) was prepared in the following manner.

Allophane (starting material) was added to water and was stirred to form a slurry. The slurry was allowed to stand, and the precipitate was separated. The thus obtained alumino-silica gel slurry was dehydrated with a filter press, dried at a temperature of 110° to 160° C., and then ground.

To 75 parts by weight of the thus obtained alumino-silica gel was incorporated 25 parts by weight of active carbon powders having a size of from 50 to 200μ, and the resulting mixture was kneaded and extruded by an extrusion granulator through screens of 0.5 to 3 mm. The thus obtained granules were dried at a temperature of about 200° C. to give alumino-silica gel kneaded together with active carbon.

Part of the alumino-silica gel incorporated with active carbon (2 g) was charged into a bag made of fine porous and gas-permeable film (trade name "Cellboa NW-04" by Sekisui Chemical Co., Ltd.) as used in Comparative Example 1, together with 100 g of high grade bleaching powders. The bag was processed in the same manner as in Comparative Example 1 and the content of remaining available chlorine after 30 days passed was measured. A decomposition rate of 16.0% was obtained.

REFERENCE EXAMPLES 2-8, COMPARATIVE EXAMPLES 2-12 AND EXAMPLES 2-8

A series of storing tests was carried out in the same manner as in Example 1, using solid chlorinating agents and storage stabilizers shown in Table 3. The solid chlorinating agents used are those commercially available as disinfectants for swimming pools, etc. The table clearly shows the superiority of the method of the present invention wherein kneaded together with active carbon alumino-silica gel was used.

In Reference Examples 3 to 4 and Comparative Examples 5 to 9, relatively small decomposition rates are obtained in spite of the fact that relatively large amounts of chlorine gas are generated therein. These results could be explained based on the nature of the solid chlorinating agents used. That is, in the case of high grade bleaching powder the decrease in the amount of available chlorine is caused mainly by its self-decomposition reaction whereby calcium chloride is formed without generating chlorine gas. In other words, the reduction of available chlorine due to the generation of chlorine gas is relatively small in this case. On the other hand, in the case of trichloroisocyanuric acid, the decrease in the amount of available chlorine is based mostly on a reaction by which chlorine gas is generated, and the self-decomposition reaction takes place only at an extremely low ration compared with the case of high grade bleaching powder.

TABLE 3

Results of Storage Tests

| | Solid Chlorinating Agent | Storage Stabilizer | Results of Test: Appearance | Amount of Chlorine Gas Generated (ppm) | Content of Available Chlorine (%) | Decomposition Rate of Available Chlorine (%) |
|---|---|---|---|---|---|---|
| Example 1 | High grade bleaching powder (granular) | Alumino-silica gel incorporated with active carbon | Surface was slightly consolidated | 7 | 59.4 | 16.0 |
| Reference | High grade | — | Surface was | 600 | 39.3 | 44.4 |

TABLE 3-continued

Results of Storage Tests

| | Solid Chlorinating Agent | Storage Stabilizer | Results of Test: Appearance | Amount of Chlorine Gas Generated (ppm) | Content of Available Chlorine (%) | Decomposition Rate of Available Chlorine (%) |
|---|---|---|---|---|---|---|
| Example 1 | bleaching powder (granular) | | consolidated and wet | | | |
| Comparative Example 1 | High grade bleaching powder (granular) | Synthetic Zeolite | Surface was consolidated | 70 | 52.1 | 26.3 |
| Comparative Example 2 | High grade bleaching powder (granular) | Active carbon (grainy) | Surface was consolidated | 160 | 46.7 | 33.9 |
| Comparative Example 3 | High grade bleaching powder (granular) | Alumino-silica gel | Consolidated a little | 20 | 55.4 | 21.6 |
| Example 2 | High grade bleaching powder (tabletted) | Alumino-silica gel incorporated with active carbon | No change | 4 | 64.4 | 8.6 |
| Reference Example 2 | High grade bleaching powder (tabletted) | — | Surface was slightly wet | 160 | 54.6 | 22.1 |
| Example 3 | TCCA* (powdery) | Alumino-silica gel incorporated with active carbon | No change | 22 | 90.9 | 0.5 |
| Reference Example 3 | TCCA* (powdery) | — | " | 800 | 88.8 | 2.8 |
| Example 4 | TCCA* (granular) | Alumino-silica gel incorporated with active carbon | " | 12 | 90.2 | 0.6 |
| Reference Example 4 | TCCA* (granular) | — | " | 600 | 88.9 | 2.0 |
| Comparative Example 5 | TCCA* (granular) | Synthetic zeolite | " | 70 | 89.6 | 1.2 |
| Comparative Example 6 | TCCA* (granular) | Active carbon (grainy) | " | 240 | 89.4 | 1.4 |
| Comparative Example 7 | TCCA* (granular) | Active carbon (powdery) | " | 200 | 89.7 | 1.1 |
| Comparative Example 8 | TCCA* (granular) | Alumino-silica gel | " | 40 | 89.6 | 1.2 |
| Comparative Example 9 | TCCA* (granular) | Alumino-silica gel + active carbon (grainy) (not kneaded) | " | 40 | 89.4 | 1.4 |
| Example 5 | TCCA* (tabletted) | Alumino-silica gel incorporated with active carbon | " | 6 | 90.1 | 0.7 |
| Reference Example 5 | TCCA* (tabletted) | — | " | 260 | 88.4 | 2.5 |
| Example 6 | DCCNa** | Alumino-silica gel incorporated with active carbon | " | 1 | 59.7 | 3.2 |
| Reference Example 6 | " | — | Surface was 45 a little consolidated | 56.7 | 8.1 | |
| Comparative Example 10 | " | Synthetic zeolite | Surface was slightly consolidated | 14 | 58.2 | 5.7 |
| Comparative Example 11 | " | Alumino-silica gel | No change | 12 | 58.2 | 5.7 |
| Example 7 | $DCCNa.2H_2O$*** | Alumino-silica gel incorporated with active carbon | " | 1 | 51.6 | 2.5 |
| Reference Example 7 | " | — | Surface slightly consolidated | 9 | 50.4 | 4.7 |
| Example 8 | DCCK*** | Alumino-silica gel incorporated with active carbon | No change | 0 | 57.8 | 1.4 |

TABLE 3-continued

Results of Storage Tests

| | Solid Chlorinating Agent | Storage Stabilizer | Appearance | Results of Test: Amount of Chlorine Gas Generated (ppm) | Results of Test: Content of Available Chlorine (%) | Results of Test: Decomposition Rate of Available Chlorine (%) |
|---|---|---|---|---|---|---|
| Reference Example 8 | " | — | " | 12 | 56.2 | 4.1 |
| Comparative Example 12 | " | Active carbon (grainy) | " | 3 | 56.0 | 4.4 |

Notes:
*Trichloroisocyanuric acid
**Sodium dichloroisocyanurate
***Dichloroisocyanuric acid dihydrate
****Potassium dichloroisocyanurate

REFERENCE EXAMPLE 9, COMPARATIVE EXAMPLES 13-15 AND EXAMPLE 9

Into 100 g each of trichloroisocyanuric acid granules was directly admixed 2 g each of stabilizers shown in Table 2. Each of the mixture was charged into the same polyethylene bag as used in Reference Example 1 and heat sealed. The bags were stored in a thermo-hygrostat for 3 days at 40° C. at a relative humidity of 80%, and then the density of chlorine gas generated in the bags was measured. Results obtained are shown in Table 4.

TABLE 4

| | Solid Chlorinating Agent | Storage Stabilizer | Chlorine Gas Generated (ppm) |
|---|---|---|---|
| Reference Example 9 | Trichloroisocyanuric acid granular | — | 220 |
| Comparative Example 13 | Trichloroisocyanuric acid granular | Synthetic zeolite | 400 |
| Comparative Example 14 | Trichloroisocyanuric acid granular | Active carbon (grainy) | 2500 |
| Comparative Example 15 | Trichloroisocyanuric acid granular | Alumino-silica gel | 250 |
| Example 9 | Trichloroisocyanuric acid granular | Alumino-silica gel incorporated with active carbon | 70 |

As is shown in Table 4, all the stabilizers except the alumino-silica gel incorporated with active carbon, do not have stabilizing effects, or rather accelerate the generation of chlorine gas when directly contacted with trichloroisocyanuric acid.

What is claimed is:

1. A method of storing a solid chlorinating agent or a composition containing a solid chlorinating agent, comprising storing a solid chlorinating agent or a composition thereof under the ambient atmosphere together with a storage stabilizer consisting of alumino-silica gel obtained from allophane and active carbon, said stabilizer being prepared from the two components via such steps as kneading, granulation and drying.

2. The method as claimed in claim 1, wherein said solid chlorinating agent is selected from trichloroisocyanuric acid, dichloroisocyanuric acid, anhydride, monohydrate or dihydrate of sodium or potassium dichloroisocyanurate or a mixture thereof, or high grade bleaching powder.

3. The method as claimed in claim 1, wherein said alumino-silica gel is prepared from allophane via such steps as purification, dehydration and drying and is represented by the following general formula:

$$Al_2O_3.mSiO_2.nH_2O+Al(OH)_3$$

wherein m is 1 to 2 and n is 2 to 3.

4. The method as claimed in claim 1, wherein said stabilizer is prepared by kneading 100 parts by weight of aluminosilica gel with 5 to 300 parts by weight of active carbon, followed by shaping or granulating and drying thereof.

5. The method as claimed in claim 1, wherein said chlorinating agent and stabilizer are placed in such a manner that said stabilizer is in direct contact with the atmosphere enclosing said chlorinating agent but not in direct contact with said agent per se.

6. The method as claimed in claim 5, wherein said solid chlorinating agent is selected from trichloroisocyanuric acid, dichloroisocyanuric acid, anhydride, monohydrate or dehydrate of sodium or potassium dichloroisocyanurate or a mixture thereof, or high grade bleaching powder.

7. The method as claimed in claim 5, wherein said alumino-silica gel is prepared from allophane via such steps as purification, dehydration and drying and is represented by the following general formula:

$$Al_2O_3.mSiO_2.nH_2O+Al(OH)_3$$

wherein m is 1 to 2 and n is 2 to 3.

8. The method as claimed in claim 5, wherein said stabilizer is prepared by kneading 100 parts by weight of alumino-silica gel with 5 to 300 parts by weight of active carbon, followed by shaping or granulating and drying thereof.

* * * * *